United States Patent
Karnik et al.

(10) Patent No.: US 10,724,454 B2
(45) Date of Patent: Jul. 28, 2020

(54) SYSTEM AND METHOD FOR OPERATING ENGINE CYLINDERS

(71) Applicant: Ford Global Technologies, LLC, Dearborn, MI (US)

(72) Inventors: Amey Y. Karnik, Canton, MI (US); Stephen Lee Cooper, Hamtramck, MI (US); Adam Nathan Banker, Canton, MI (US); Michael Howard Shelby, Plymouth, MI (US); John Eric Rollinger, Troy, MI (US); Adam J. Richards, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/356,537

(22) Filed: Mar. 18, 2019

(65) Prior Publication Data
US 2019/0211762 A1    Jul. 11, 2019

Related U.S. Application Data (63) Continuation of application No. 15/290,579, filed on Oct. 11, 2016, now Pat. No. 10,233,852.

(51) Int. Cl.
| | | |
|---|---|---|
| F02D 13/06 | (2006.01) | |
| F02D 17/02 | (2006.01) | |
| F02D 41/00 | (2006.01) | |
| F02D 41/26 | (2006.01) | |
| F02D 41/30 | (2006.01) | |

(52) U.S. Cl.
CPC ......... *F02D 41/0087* (2013.01); *F02D 13/06* (2013.01); *F02D 17/02* (2013.01); *F02D 41/26* (2013.01); *F02D 41/3005* (2013.01); *F02D 2041/0012* (2013.01); *F02D 2250/18* (2013.01)

(58) Field of Classification Search
CPC .......... F02D 13/06; F02D 17/00; F02D 17/02; F02D 41/0087
USPC .............................. 123/198 F, 481; 701/103
See application file for complete search history.

(56) References Cited

U.S. PATENT DOCUMENTS

| | | | |
|---|---|---|---|
| 2011/0208405 | A1 | 8/2011 | Tripathi et al. |
| 2011/0213540 | A1 | 9/2011 | Tripathi et al. |
| 2014/0041630 | A1 | 2/2014 | Carlson et al. |
| 2020/0080500 | A1* | 3/2020 | Pirjaberi ................. F02D 13/06 |

* cited by examiner

*Primary Examiner* — Erick R Solis
(74) *Attorney, Agent, or Firm* — Geoffrey Brumbaugh; McCoy Russell LLP (57) ABSTRACT

Systems and methods for activating and deactivating cylinders of an engine that may activate and deactivate one cylinder independent of other cylinders are presented. In one example, an engine cylinder firing fraction and a remainder value that is based on the engine cylinder firing fraction are a basis for activating and deactivating engine cylinders. The systems and methods also provide for transitioning between different cylinder firing fractions.

20 Claims, 6 Drawing Sheets

SYSTEM AND METHOD FOR OPERATING ENGINE CYLINDERS

CROSS REFERENCE TO RELATED APPLICATION

The present application is a continuation of U.S. Non-Provisional patent application Ser. No. 15/290,579 entitled "SYSTEM AND METHOD FOR OPERATING ENGINE CYLINDERS," and filed on Oct. 11, 2016. The entire contents of the above-listed application are hereby incorporated by reference for all purposes.

FIELD

The present description relates to a system and methods for selectively activating and deactivating cylinders of an engine to conserve fuel while meeting torque demands. The system and methods vary which cylinders of an engine fire from one engine cycle to the next engine cycle.

BACKGROUND AND SUMMARY

An engine may include a plurality of cylinders to provide a higher level of torque. During high torque demand conditions, intake manifold pressure may be high so that engine pumping losses may be reduced. However, at closed and part-open throttle conditions, engine efficiency may be reduced due to higher pumping losses and lower thermal efficiency. One way to reduce engine pumping losses while preserving engine torque at higher load conditions is to selectively activate and deactivate engine cylinders. Engine cylinders may be deactivated via holding intake and exhaust valves closed over an engine cycle without injecting fuel to the deactivated cylinders. Cylinders may be deactivated and reactivated in groups, but a large number of cylinder groups and firing patterns stored in controller memory may be necessary if cylinder activation and deactivation is based simply on switching on and off predetermined groups and patterns of engine cylinders. Therefore, it may be desirable to provide a way of selecting cylinders to be activated or deactivated without having to rely on predetermined cylinder groups or patterns.

The inventors herein have recognized the above-mentioned issues and have developed an engine control method, comprising: activating and deactivating a cylinder of an engine via a controller in response to an engine cylinder firing fraction and a remainder value, the remainder value based on the engine cylinder firing fraction.

By activating and deactivating cylinders of an engine in response to an engine cylinder firing fraction and a remainder value based on the cylinder firing fraction, it may be possible to provide the technical result of changing which cylinders of a cylinder are deactivated and not firing without having to store a large number of cylinder firing groups or patterns. In particular, an engine firing fraction may be a basis for calculations that have a remainder that varies between an upper value threshold and a lower value threshold. The remainder is updated for each most recent cylinder event (e.g., cylinder stroke or other cylinder related event), and an engine cylinder is activated or not activated based on a value provided by summing the engine cylinder firing fraction and the remainder. As the remainder moves back and forth between the upper value threshold and the lower value threshold, engine cylinders are activated or not activated. The engine cylinders are activated and combust air and fuel at a rate of the engine cylinder firing fraction.

The present description may provide several advantages. In particular, the approach may simplify cylinder deactivation by reducing complexity of skip activation cylinder control algorithms. Further, the approach provides for smooth transitions between operating an engine with different engine cylinder firing fractions. In addition, the approach may reduce controller memory usage by reducing engine cylinder groupings or patterns that form a basis for activating or deactivating engine cylinders.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
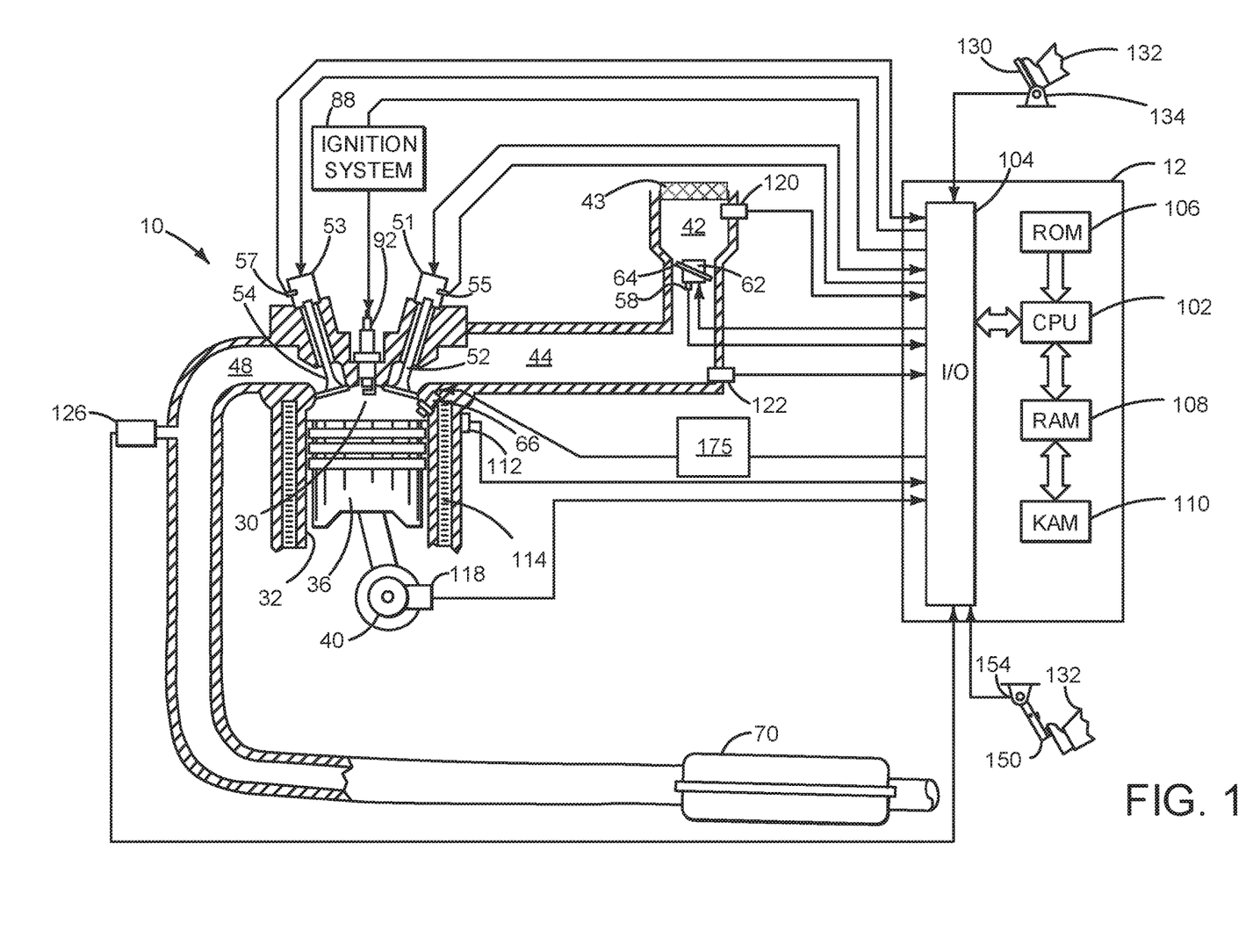
FIG. 1 is a schematic diagram of an engine.
Figure 2A:
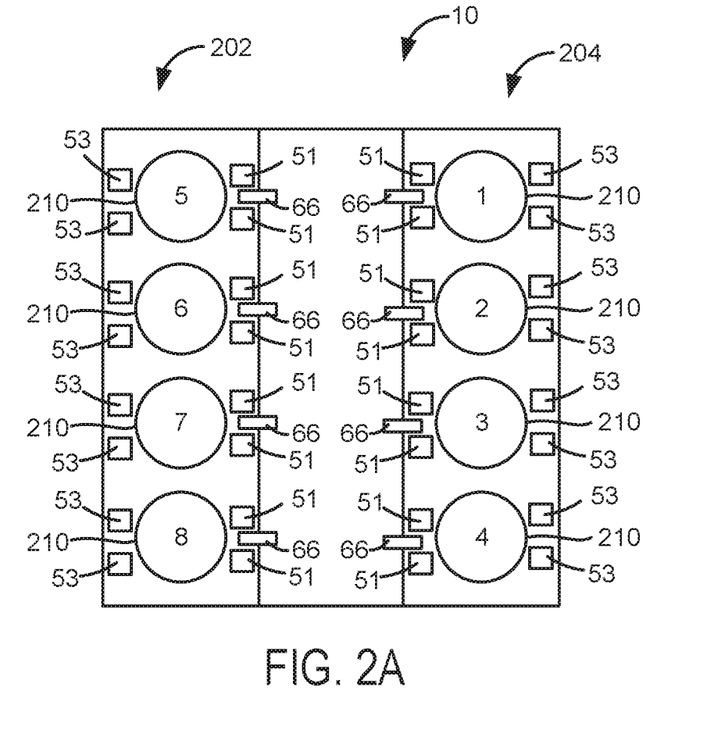
FIG. 2A is a schematic diagram of an eight cylinder engine with two cylinder banks.
Figure 2B:
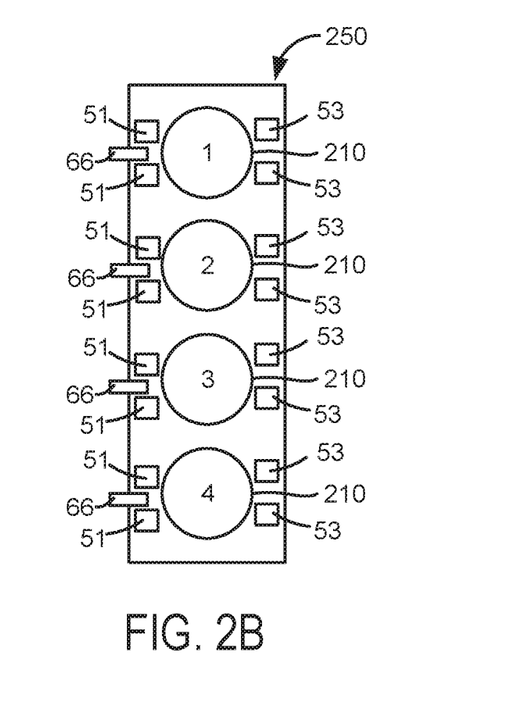
FIG. 2B is a schematic diagram of a four cylinder engine with a single cylinder bank.
Figure 3A:
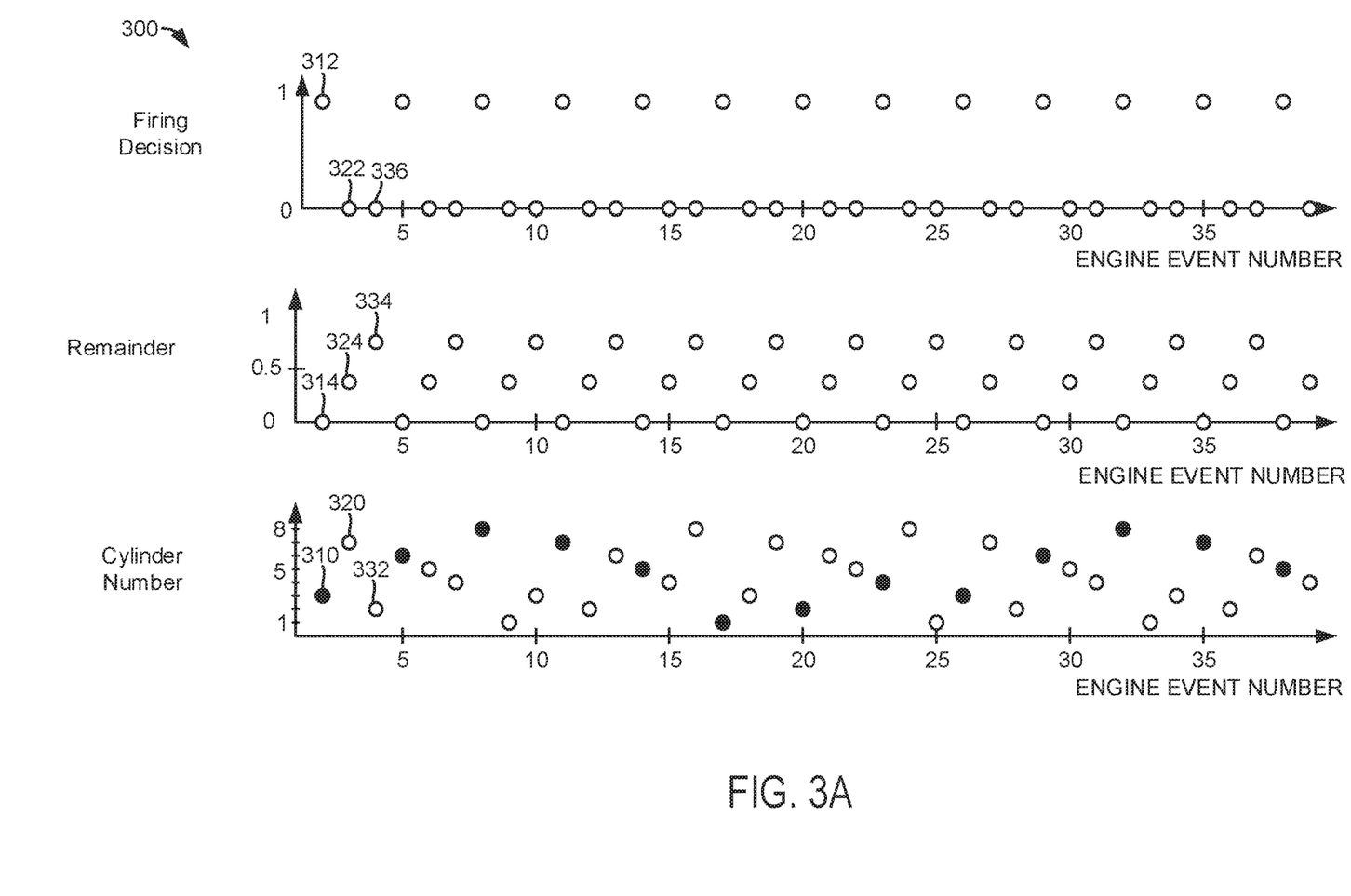
FIG. 3A is plot of a first example operating sequence.
Figure 3B:
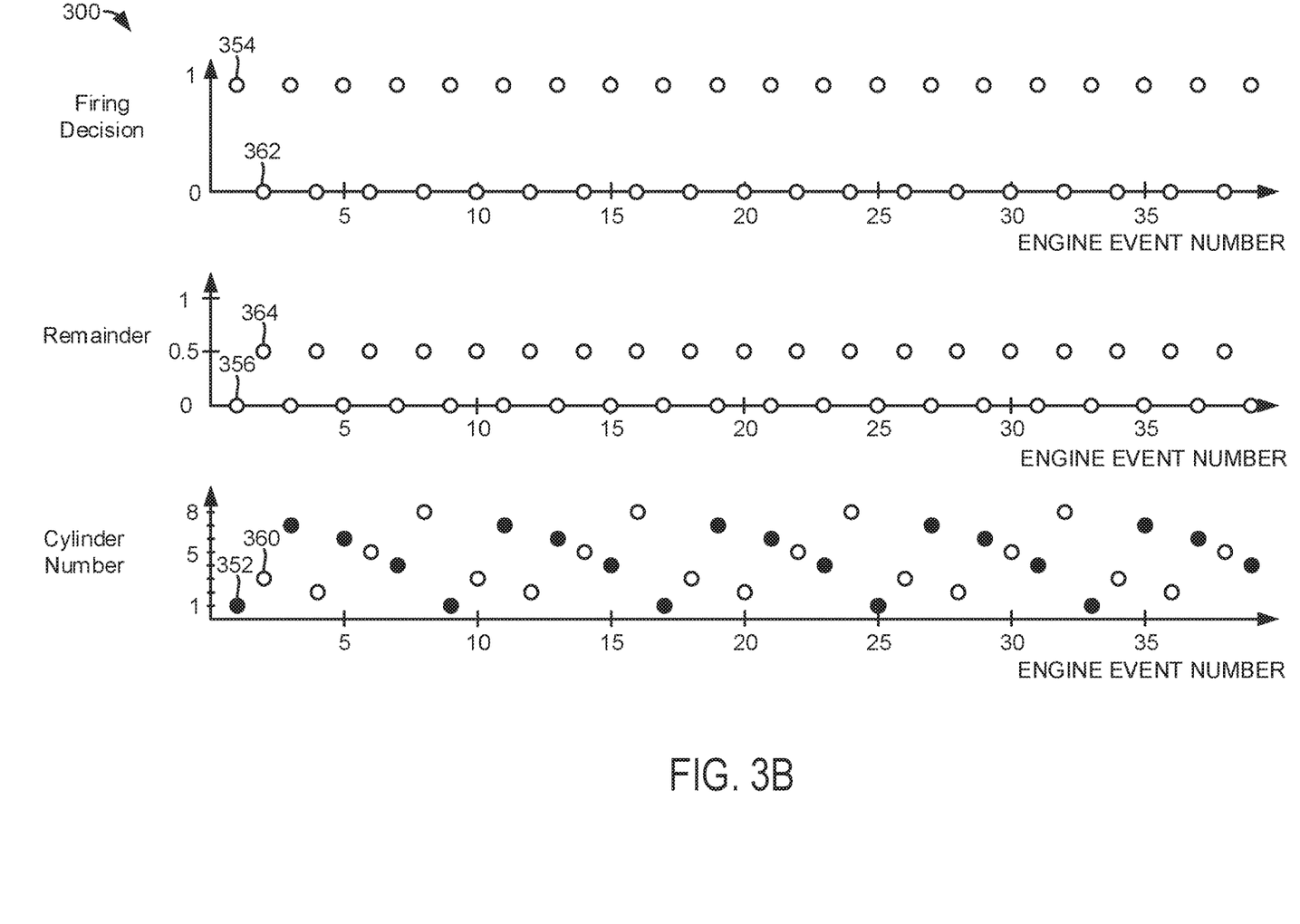
FIG. 3B is a plot of a second example operating sequence.
Figure 4:
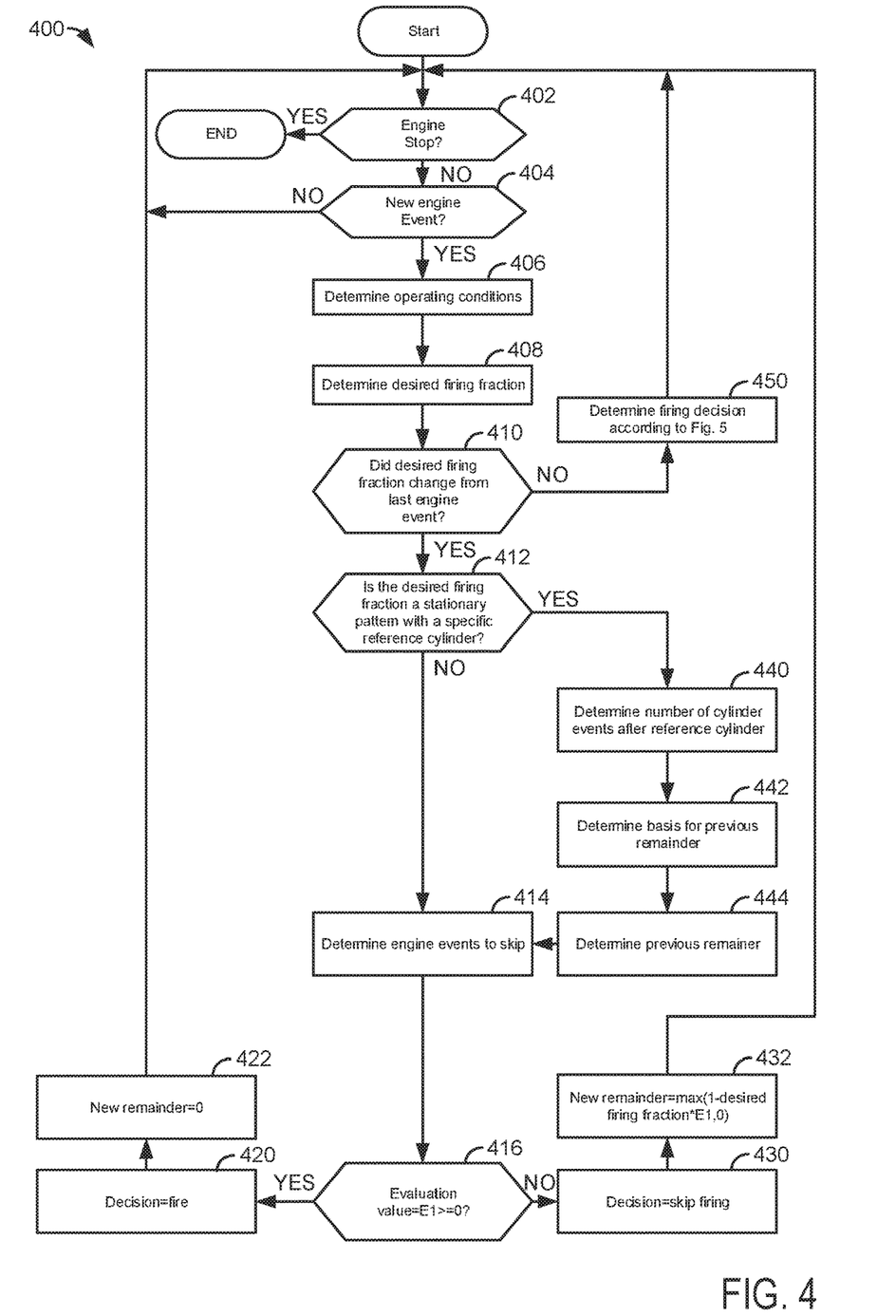
FIGS. 4 and 5 show flow charts of an example method for operating an engine.
Figure 5:
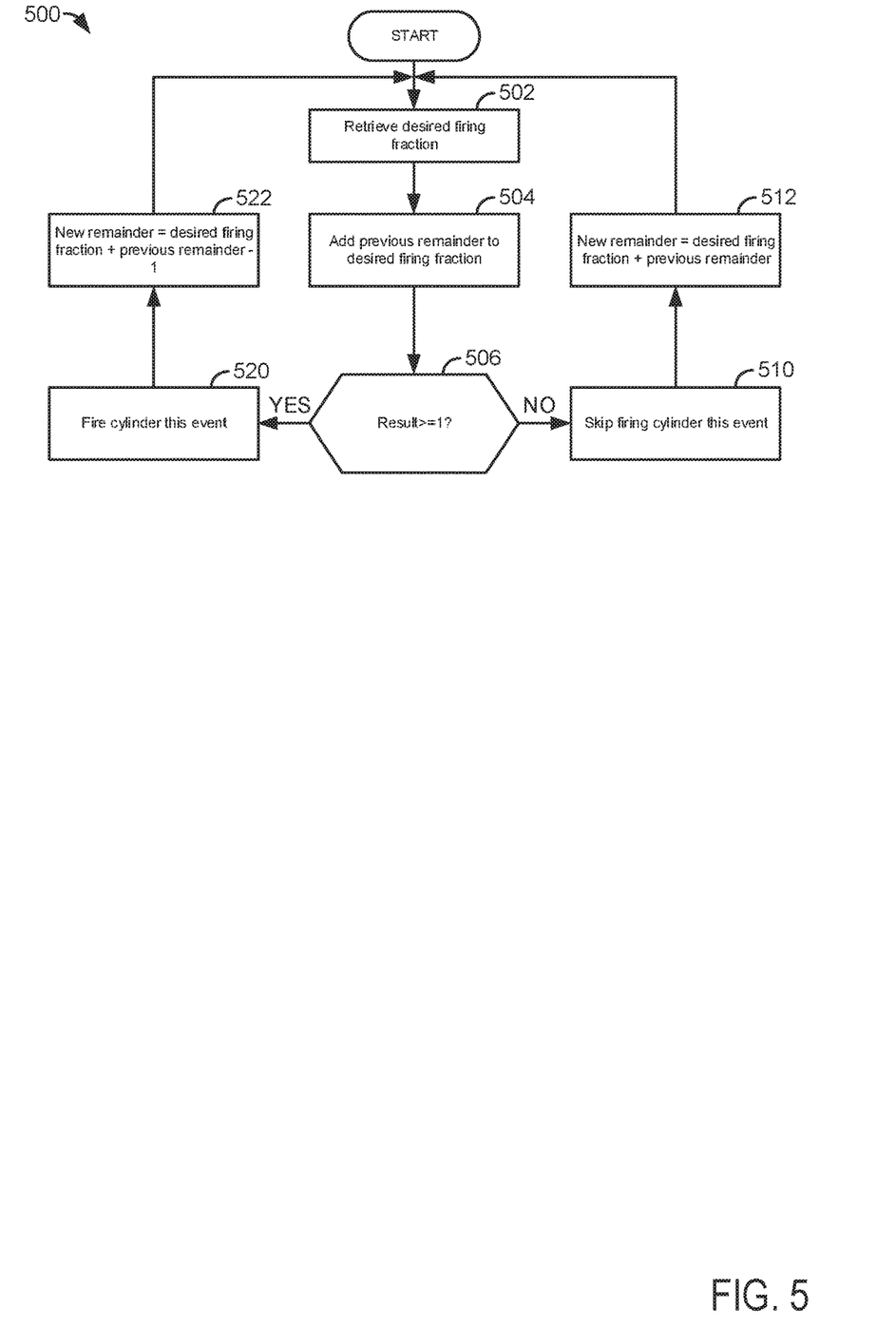

The present description is related to determining which cylinders of an engine are active and firing, or deactivated and not firing, during an engine cycle. The engine may be an engine as shown in FIGS. 1-2B. The engine may be operated via a controller according to the sequences shown in FIGS. 3A and 3B. A method for operating the engine of FIGS. 1-2B to provide the sequences of FIGS. 3A and 3B is shown in FIGS. 4 and 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by a variable intake valve operator 51 and a variable exhaust valve operator 53, which may be actuated mechanically, electrically, hydraulically, or by a combination of the same. Intake valve operator 51 and an exhaust valve operator may open intake 52 and exhaust 54 valves synchronously or asynchronously with crankshaft 40. The position of intake valve 52 may be determined by intake valve position sensor 55. The position of exhaust valve 54 may be determined by exhaust valve position sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a pattern of deactivated cylinders) may be deactivated during an engine cycle (e.g., two revolutions for a four stroke engine). During a different engine cycle, cylinders 1, 4, 6, and 7 may be deactivated. Further, other patterns of cylinders may be selectively deactivated based on vehicle operating conditions. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during a cycle of the cylinder. An engine cylinder may be activated by its variable intake valve operators 51 and variable exhaust valve operators 53 opening and closing intake and exhaust valves of the cylinder during a cycle of the cylinder. Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine.

Referring now to FIG. 2B, an example multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated)to improve engine fuel economy when less than the engine's full torque capacity is requested. For example, cylinders 2 and 3 (e.g., a pattern of deactivated cylinders) may be deactivated during an engine cycle (e.g., two revolutions for a four stroke engine). During a different engine cycle, cylinders 1 and 4 may be deactivated. Further, other patterns of cylinders may be selectively deactivated based on vehicle operating conditions.

Engine 10 includes a single cylinder bank 250, which includes four cylinders 1-4. Cylinders of the single bank may be active or deactivated during a cycle of the engine. Each cylinder includes variable intake valve operators 51 and variable exhaust valve operators 53. An engine cylinder may be deactivated by its variable intake valve operators 51 and variable exhaust valve operators holding intake and exhaust valves of the cylinder closed during a cycle of the cylinder. An engine cylinder may be activated by its variable intake valve operators 51 and variable exhaust valve operators 53 opening and closing intake and exhaust valves of the cylinder during a cycle of the cylinder.

Thus, the system of FIGS. 1-2B provide for an engine system, comprising: an engine including one or more cylinder deactivating mechanisms; a controller including executable instructions stored in non-transitory memory to activate and fire a cylinder, or deactivate and not fire the cylinder, in response to a value based on an engine cylinder firing fraction and a remainder, the remainder a value based on the engine cylinder firing fraction and a previous remainder, the previous remainder initialized with a predetermined value. The engine system includes where the engine cylinder firing fraction is an actual total number of cylinder firing events divided by an actual total number of cylinder compression strokes over a predetermined actual total number of cylinder compression strokes. The engine system includes where the remainder is a value left over after adding the previous remainder to the engine cylinder firing fraction; and where the remainder is further decremented by a value of 1 every time a cylinder fires.

In some examples, the engine system further comprises additional instructions to adjust the previous remainder in response to the engine cylinder firing fraction changing and the engine cylinder firing fraction providing a stationary cylinder firing pattern with a reference cylinder; and additional instructions to not adjust the previous remainder in response to the engine cylinder firing fraction changing and the engine cylinder firing fraction not providing the stationary cylinder firing pattern with the reference cylinder. The engine system includes where the engine cylinder is deactivated via holding intake and exhaust valves of the cylinder closed over a cycle of the cylinder. The engine system includes where the engine cylinder is deactivated via ceasing fuel flow to the engine cylinder.

Referring now to FIG. 3A, plots of an engine operating sequence are shown. The three plots are aligned in time and occur at the same time. The sequence may be provided by the system of FIGS. 1 and 2A including the method of FIGS. 4 and 5 stored as executable instructions in non-transitory memory. The sequence of FIG. 3A is based on an eight cylinder for stroke engine having a firing order or order of combustion of 1, 3, 7, 2, 6, 5, 4, 8. The engine cylinder firing fraction for this sequence is 0.333.

The first plot from the top of FIG. 3A is a plot of cylinder activation (e.g., firing with intake and exhaust valves opening and closing during a cycle of the cylinder) or deactivation (e.g., not firing with intake and exhaust valves held closed during a cycle of the cylinder) decision for engine cylinders versus engine event number. An engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three.

The decision to activate or deactivate a cylinder and open and close the cylinder's intake and exhaust valve may be made a predetermined number of cylinder events (e.g., one cylinder event, or alternatively, one cylinder cycle or eight cylinder events for an eight cylinder engine) before the cylinder is to be activated or deactivated to allow time to begin the process of opening and closing intake and exhaust valves of the cylinder being evaluated. For example, for an eight cylinder engine with a firing order of 1, 3, 7, 2, 6, 5, 4, 8, the decision to activate or deactivate cylinder number seven may be made during an intake or compression stroke of cylinder number seven one engine cycle before cylinder number seven is deactivated. Alternatively, the decision to activate or not activate a cylinder may be made a predetermined number of engine events or cylinder events before the selected cylinder is activated or deactivated. The cylinder on its compression stroke at the time corresponding to the event number is activated when the firing decision value indicated by circle is one. The cylinder on its compression stroke at the time corresponding to the event number is not activated when the firing decision value indicated by circle is zero. The vertical axis represents the firing decision and the horizontal axis represents cylinder event number or actual total number of cylinder events.

The second plot from the top of FIG. 3A is a plot of a value of a remainder versus cylinder event number or the actual total number of cylinder events. The remainder value and how it is arrived at is described in greater detail in the description of FIGS. 4 and 5. The vertical axis represents the value of the remainder. The horizontal axis represents cylinder event number or actual total number of cylinder events.

The third plot from the top of FIG. 3A is a plot of cylinder numbers that correspond to the firing decisions shown in the first plot from the top of FIG. 3. The vertical axis represents the cylinder number for the present cylinder being evaluated. The horizontal axis represents cylinder event number or actual total number of cylinder events. The solid filled circles represent an active cylinder with combustion during the cylinder's cycle. The circles that are not filled represent deactivated cylinders without combustion during the cylinder's cycle.

In this example, the first engine event corresponds to cylinder number three as indicated at 310. Cylinder number three fires as indicated by the filled circle at 310 and the firing decision at 312 being one. The remainder value corresponding to the first engine event is 0 as indicated at 314. The second engine event corresponds to cylinder number seven as indicated at 320. Cylinder number seven does not fire as indicated by the unfilled circle at 320 and the firing decision at 322 being zero. The remainder value corresponding to the second engine event is 0.333 (i.e., 1 divided by 3) as indicated at 324. The third engine event is cylinder number two as indicated at 332. The cylinder number two is also deactivated and does not fire as shown by the hollow circle at 332 and the firing decision of zero at 336. The remainder for this event is 0.667 (i.e., 2 divided by 3), as shown in 334.

Firing decisions for the remaining cylinders follow a similar convention.

It may be observed that the engine's cylinders are activated and fire three times for every nine compression strokes so that the engine follows the desired 0.333 engine cylinder firing fraction. The remainder value is incremented for each engine event, and if the resulting remainder value is less than 1, the corresponding cylinder is deactivated. Each time the remainder exceeds a value of one, the corresponding cylinder is activated and it fires, and the remainder value decrements by value equal to 1. The 0.333 engine cylinder firing fraction is a non-stationary pattern because the cylinders that are activated change from engine cycle to engine cycle. Further, there is no choice for a reference cylinder because the activated cylinders change from engine cycle to engine cycle. All engine cylinders may fire over the course of one or more cylinder cycles for a non-stationary pattern.

Referring now to FIG. 3B, plots of an engine operating sequence are shown. The three plots are aligned in time and occur at the same time. The sequence may be provided by the system of FIGS. 1 and 2A including the method of FIGS. 4 and 5 stored as executable instructions in non-transitory memory. The sequence of FIG. 3B is based on an eight cylinder for stroke engine having a firing order or order of combustion of 1, 3, 7, 2, 6, 5, 4, 8. The engine cylinder firing fraction for this sequence is 0.5.

The first plot from the top of FIG. 3B is a plot of cylinder activation or deactivation decision for engine cylinders versus engine event number. The vertical axis represents the firing decision and the horizontal axis represents engine event number or actual total number of engine events.

The second plot from the top of FIG. 3B is a plot of a value of a remainder versus engine event number or the actual total number of cylinder events. The remainder value and how it is arrived at is described in greater detail in the description of FIGS. 4 and 5. The vertical axis represents the value of the remainder. The horizontal axis represents engine event number or actual total number of cylinder events.

The third plot from the top of FIG. 3B is a plot of cylinder numbers that correspond to the firing decisions shown in the first plot from the top of FIG. 3. The vertical axis represents the cylinder number for the engine event being evaluated. The horizontal axis represents cylinder event number or actual total number of cylinder events. The solid filled circles represent an active cylinder with combustion during the cylinder's cycle. The circles that are not filled represent deactivated cylinders without combustion during the cylinder's cycle.

In this example, the first engine event corresponds to cylinder number one as indicated at 352. Cylinder number one fires as indicated by the filled circle at 352 and the firing decision at 354 being one. The remainder value corresponding to the first engine event is 0 as indicated at 356. The second engine event corresponds to cylinder number three as indicated at 360. Cylinder number three is deactivated and it does not fire as indicated by the unfilled circle at 360 and the firing decision at 362 being 0. The remainder value corresponding to the second engine event is 0.5 as indicated at 364. Firing decisions for the remaining cylinders follow a similar convention.

It may be observed that the engine's cylinders are activated and fire five times for every ten compression strokes so that the engine follows the desired 0.5 engine cylinder firing fraction. Each time the remainder value exceeds one, the cylinder at that time is activated and it fires, and the remainder is decremented by 1. Thus, the remainder value stored in memory varies between zero and one. The 0.5 engine cylinder firing fraction is a stationary pattern because the cylinders that are activated do not change from engine cycle to engine cycle. For example, cylinders 1, 6, 7, and 4 always fire while cylinders 2, 3, 5, and 8 do not fire at any time during the sequence. For a stationary pattern, any one of the firing cylinders may be selected as a reference cylinder. The sequence initialization may be based on first firing the reference cylinder. In this example, cylinder number one may be the reference cylinder.

Referring now to FIGS. 4 and 5, a flow chart describing cylinder activation and deactivation for engine cylinders that may change operating state every cylinder cycle is shown. The method of FIGS. 4 and 5 may be incorporated into and may cooperate with the system of FIGS. 1-2B. Further, at least portions of the method of FIGS. 4 and 5 may be incorporated as executable instructions stored in non-transitory memory while other portions of the method may be performed via a controller transforming operating states of devices and actuators in the physical world. Method 400 includes cylinder event based operations as indicated below. Event based operations may be initiated by hardware interrupts produced via an engine position sensor or a signal that is based off input from an engine position sensor.

At 402, method 400 judges if an engine stop is requested. An engine stop may be requested via a driver pushing a button or turning a key. Further, an engine stop may be requested via a controller in response to various vehicle operating conditions. If method 400 judges that an engine stop request is present, method 400 proceeds to exit. Otherwise, method 400 proceeds to 404.

At 404, method 400 judges if a new engine event is present. A new engine event may occur as the engine rotates and engine cylinders proceed through their strokes (e.g., intake, compression, power, and exhaust). One engine event occurs for each engine cylinder during a cycle of the engine (e.g., two revolutions). Thus, for an eight cylinder engine, there will be eight engine events every two engine revolutions. An engine event may be when a cylinder begins or ends a particular stroke (e.g., intake, compression, power, or exhaust), a valve opening or closing time for the cylinder, a position of a piston in the cylinder relative to crankshaft position, a timing of spark or combustion initiation in the cylinder, or another event related to the cylinder. If method 400 judges that a cylinder event has occurred, method 400 proceeds to 406. Otherwise, method 400 returns to 402.

At 406, method determines vehicle operating conditions. Operating conditions may include, but are not limited to requested engine torque, engine speed, and vehicle speed. The requested engine torque may be based on accelerator pedal position and vehicle speed. For example, accelerator pedal position and vehicle speed may be a basis for indexing a table or function in controller memory. The table or function outputs a requested engine torque from empirically determined values stored in the table. Method 400 proceeds to 408.

At 408, method 400 determines a desired engine cylinder firing fraction. The desired engine cylinder firing fraction is an actual total number of cylinder firing events divided by an actual total number of cylinder compression strokes over a predetermined actual total number of cylinder compression strokes. In one example, the desired engine cylinder firing fraction is determined from the requested engine torque. In particular, allowable engine cylinder firing fraction values may be stored in a table or function that may be indexed by desired engine torque and engine speed. Engine cylinder firing fraction values that may provide the requested engine torque may be part of a group of available engine cylinder firing fraction values. Then, based on other vehicle operating conditions, desired engine cylinder firing fractions may be eliminated from the group of available engine cylinder firing fraction values. For example, some engine cylinder firing fraction may be removed from the group if the cylinder firing fractions provide higher levels of engine vibration. Then, the engine cylinder firing fraction that provides the fewest number of activate engine cylinders during a cycle may be selected from the group of available engine cylinder firing fraction values to provide the desired engine cylinder firing fraction. In this way, a single desired engine cylinder firing fraction may be selected from a group of a large number of engine cylinder firing fractions. Method 400 proceeds to 410 after the desired engine cylinder firing fraction is determined.

At 410, method 400 judges if the desired firing fraction changed from a last engine event. If the answer is yes, method 400 proceeds to 412. Otherwise, the answer is no and method 400 proceeds to 450. For example, if a last previous engine event engine cylinder firing fraction value was 0.333 and an engine cylinder firing fraction for the present engine event if 0.5, the answer is yes and method 400 proceeds to 412. Otherwise, the answer is no and method 400 proceeds to 450.

At 450, method 400 determines a cylinder activation and firing decision according to the method of FIG. 5. Method 400 returns to 402 after the cylinder activation and firing decision is made.

At 412, method 400 judges if the desired engine cylinder firing fraction is a stationary pattern with a reference cylinder. In one example, each engine cylinder firing fraction stored in the table or function at 408 includes accompanying attributes that indicate if the engine cylinder firing fraction is a stationary pattern with a reference cylinder. For example, the attribute may be a value of one if the engine cylinder firing fraction is a stationary pattern with a reference cylinder. The attribute may be a value of zero if the engine cylinder firing fraction is not a stationary pattern with a reference cylinder. Method 400 judges if the desired engine cylinder firing fraction is a stationary pattern based on values of the attributes. If method 400 judges that the engine cylinder firing fraction is a stationary pattern, the answer is yes and method 400 proceeds to 444. Otherwise, the answer is no and method 400 proceeds to 414.

At 414, method 400 determines a number of engine events to skip firing (e.g., engine compression strokes where the cylinders are deactivated). In particular, method 400 determines a whole number of engine events to skip (e.g., not activate or fire engine cylinders) prior to activating and firing a cylinder based on the following equation:

$$E1 = \text{floor}(\max(1 - \text{previous\_remainder} - FF)/FF), 0)$$

where E1 is a whole number of engine events to skip, floor is a function that round down to closest integer (e.g., floor (arg) equals −2 when arg equals −1.7), max is a function that returns a maximum value from a group of values (e.g., max(−1,0) returns a value of zero), and previous_remainder is a value of a most recent past remainder from the last most recent engine event. For example, if the cylinder corresponding to the present engine event is cylinder number one of a cylinder having a firing order of 1, 3, 7, 2, 6, 5, 4, 8, then the previous remainder corresponds to the remainder associated with cylinder number eight for the last engine event. Method 400 proceeds to 416.

At 416, method 400 judges if the value of E1 is greater than or equal to zero. If so, the answer is yes and method 400 proceeds to 420. Otherwise, the answer is no and method 400 proceeds to 430.

At 420, method 400 decides to activate and fire the cylinder based on the cylinder associated with the present engine event. For example, if the present engine event is a compression stroke for cylinder number one of an engine with a firing order of 1, 3, 7, 2, 6, 5, 4, 8, then cylinder number three may be activated and fired since cylinder number three is a predetermined number of engine events from cylinder number one in the engine firing order (e.g., one engine event away). Alternatively, cylinder number one during a next cylinder cycle may be activated and fired. Method 400 proceeds to 422.

At 422, method 400 changes the value of the remainder to zero. Thus, the remainder takes on a new value to become a new remainder for the present engine event. The new remainder becomes the previous remainder for the next engine event. Method 400 returns to 402.

At 430, method 400 decides to not activate and not fire the cylinder based on the cylinder associated with the present engine event. For example, if the present engine event is a compression stroke for cylinder number one of an engine with a firing order of 1, 3, 7, 2, 6, 5, 4, 8, then cylinder number three may not be activated and not fired since cylinder number three is a predetermined number of engine events from cylinder number one in the engine firing order (e.g., one engine event away). Alternatively, cylinder number one during a next cylinder cycle may not be activated and fired. Method 400 proceeds to 432.

At 432, method 400 determines a remainder value based on the following equation:

$$\text{New\_remainder} = \max(1 - \text{desired}FF \cdot E1, 0)$$

where New_remainder is the value of the new remainder, max is a function that returns a maximum value from a group of values, desiredFF is the desired engine cylinder firing fraction from 408, and E1 is the whole number of engine events to skip. The present value of remainder takes on a new value to become a new remainder for the present engine event. The new remainder becomes the previous remainder for the next engine event. The new remainder and remainder are real numbers. Method 400 returns to 402.

At 440, method 400 determines the actual total number of engine events past the reference cylinder. For example, if the present engine event is for cylinder number 6 of an engine with a firing order of 1, 3, 7, 2, 6, 5, 4, 8 and the reference cylinder is cylinder number 3, the actual total number of engine events past cylinder number 3 is three. The actual total number of engine events past the reference cylinder may be stored as a variable E2. Method 400 proceeds to 442.

At 442, method 400 determines a basis for determining a previous remainder value. The basis for determining the previous remainder may be a variable X1 and it may be determined via the following equation:

$$X1 = (E2+1) \cdot \text{desired}FF \cdot Ncyl$$

where X1 is the basis variable for determining a previous remainder value, mod is a function that divides a first argument by a second argument and returns an integer remainder (e.g., mod(arg1, arg2)), E2 is the actual total number of engine events past the reference cylinder, and Ncyl is the number of engine cylinders. Method 400 proceeds to 444.

At 444, method 400 determines a value for a previous remainder based in part on the actual total number of cylinder events past the reference cylinder from 440. The previous remainder is determined via the following equation:

$$previous\_remainder = mod(X1, Ncyl)/Ncyl$$

where previous_remainder is a value of a most recent past remainder from the last most recent engine event, mod is a function that divides a first argument by a second argument and returns an integer remainder (e.g., mod(arg1, arg2)), X1 is a variable as described at 442, and Ncyl is a number of cylinders of the engine. Method 400 proceeds to 414 after the previous remainder is determined.

Referring now to FIG. 5, method 500 retrieves the desired engine cylinder firing fraction determined at 408 from controller memory and proceeds to 504.

At 504, method 500 adds a value of the previous remainder from the last engine event to the desired engine cylinder firing fraction. Method 500 proceeds to 506.

At 506, method 500 judges if the result of adding the previous remainder to the desired engine cylinder firing fraction is greater than or equal to a value of one. If so, the answer is yes and method 500 proceeds to 520. Otherwise, the answer is no and method 500 proceeds to 510.

At 520, method 500 updates a cylinder firing schedule to activate and fire the cylinder corresponding to the engine event for earlier than or during the next engine cycle. For example, if the cylinder corresponding to the present engine event is cylinder number one and the engine firing order is 1, 3, 7, 2, 6, 5, 4, 8, then cylinder number one during the next cylinder cycle is activated and fired. Alternatively, a cylinder a predetermined number of firing events from the present cylinder event may be activated. For example, if the cylinder corresponding to the present engine event is cylinder number one and the engine firing order is 1, 3, 7, 2, 6, 5, 4, 8, then cylinder number two during the present cylinder cycle may be activated and fired. Method 500 proceeds to 522.

At 522, method 500 determines a value for the new remainder. Method 500 determines a remainder value based on the following equation:

$$New\_remainder = desiredFF + previous\_remainder - 1$$

where New_remainder is the value of the new remainder, desiredFF is the desired engine cylinder firing fraction from 408, and previous_remainder is a value of a most recent past remainder from the last most recent engine event. Method 500 returns to 450 of FIG. 4.

At 510, method 500 deactivates and does not fire the cylinder for the present/next engine event in the engine firing order. For example, if the cylinder corresponding to the present engine event is cylinder number one and the engine firing order is 1, 3, 7, 2, 6, 5, 4, 8, then cylinder number one during the next cylinder cycle is not activated and fired. Alternatively, a cylinder a predetermined number of firing events from the present cylinder event may be activated. For example, if the cylinder corresponding to the present engine event is cylinder number one and the engine firing order is 1, 3, 7, 2, 6, 5, 4, 8, then cylinder number two during the present cylinder cycle may not be activated and fired. Method 500 proceeds to 512.

At 512, method 500 determines a value for the new remainder. Method 500 determines a remainder value based on the following equation:

$$New\_remainder = desiredFF + previous\_remainder$$

where New_remainder is the value of the new remainder, desiredFF is the desired engine cylinder firing fraction from 408, and previous_remainder is a value of a most recent past remainder from the last most recent engine event. Method 500 returns to 450 of FIG. 4.

Thus, the methods of FIGS. 4 and 5 provide for an engine control method, comprising: activating and deactivating a cylinder of an engine via a controller in response to an engine cylinder firing fraction and a remainder value, the remainder value based on the engine cylinder firing fraction. The method includes where the engine cylinder is deactivated via holding intake and exhaust valves of the cylinder closed over a cycle of the cylinder. The method includes where the engine cylinder is deactivated via ceasing fuel flow to the engine cylinder. The method further comprises adjusting the remainder value in response to a cylinder event, the cylinder event an event associated with operation of the cylinder. The method includes where the event associated with operation of the cylinder is a position of a piston in the cylinder or a stroke of the cylinder. The method includes where the engine cylinder firing fraction is an actual total number of cylinder firing events divided by an actual total number of cylinder compression strokes over a predetermined actual total number of cylinder compression strokes. The method includes where the remainder is a value left over after adding a previous remainder to the engine cylinder firing fraction, and where the previous remainder is initialized with a predetermined value.

The methods of FIGS. 4 and 5 also provide for an engine control method, comprising: providing an engine cylinder firing fraction via a controller based on a desired engine torque; adjusting a previous remainder value in response to the engine cylinder firing fraction changing and the engine cylinder firing fraction providing a stationary cylinder firing pattern with a reference cylinder, the previous remainder value not adjusted in response to the engine cylinder firing fraction changing and the engine cylinder firing fraction not providing the stationary cylinder firing pattern with the reference cylinder; and firing or not firing an engine cylinder via the controller in response to the previous remainder.

In some examples, the method includes where the engine cylinder is fired via supplying a spark to the engine cylinder, and further comprising: activating the engine cylinder via opening and closing intake and exhaust valves of the engine cylinder during a cycle of the engine cylinder where the engine cylinder is fired. The method further comprises deactivating the engine cylinder via holding intake and exhaust valves of the engine cylinder closed during a cycle of the engine cylinder where the engine cylinder is not fired. The method includes where the engine cylinder is fired when the rounded value is greater than zero, and where the engine cylinder is not fired when the rounded value is less than zero. The method further comprises not adjusting the previous remainder in response to the engine cylinder firing fraction not changing. The method includes where adjusting the previous remainder includes adjusting the previous remainder for the reference cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
   activating and deactivating a cylinder of an engine via a controller in response to an engine cylinder firing fraction and a remainder value when the engine cylinder firing fraction does not change from a last engine stroke to a present engine stroke, the remainder value based on the engine cylinder firing fraction.

2. The method of claim 1, where the engine cylinder is deactivated via holding intake and exhaust valves of the cylinder closed over a cycle of the cylinder.

3. The method of claim 1, where the engine cylinder is deactivated via ceasing fuel flow to the engine cylinder.

4. The method of claim 1, further comprising activating and deactivating the cylinder of the engine via the controller in response to a previous remainder when the engine cylinder firing fraction does change from the last engine stroke to the present engine stroke.

5. The method of claim 1, further comprising adding a previous remainder to the cylinder firing fraction.

6. The method of claim 5, where the activating and deactivating of the cylinder is based on a sum of the engine cylinder firing fraction and the remainder value.

7. The method of claim 6, where the cylinder is activated when the sum of the engine cylinder firing fraction and the remainder value is greater than one.

8. An engine control method, comprising:
   providing an engine cylinder firing fraction via a controller based on a desired engine torque;
   adjusting a previous remainder value in response to the engine cylinder firing fraction changing and the engine cylinder firing fraction providing a stationary cylinder firing pattern with a reference cylinder, the previous remainder value based on a number of engine cylinders and an actual total number of cylinder events after a reference cylinder;
   not adjusting the previous remainder value in response to the engine cylinder firing fraction changing and the engine cylinder firing fraction not providing the stationary cylinder firing pattern with the reference cylinder;
   firing or not firing an engine cylinder via the controller in response to the previous remainder value; and
   equating a new remainder to a value of zero when firing the cylinder during a present engine cycle, the new remainder a basis for firing or not firing a cylinder during a subsequent cylinder cycle.

9. The method of claim 8, further comprising determining the new remainder from the cylinder firing fraction when not firing the cylinder during a present engine cycle.

10. The method of claim 8, further comprising firing and not firing the cylinder of via the controller in response to the engine cylinder firing fraction and a remainder value when the engine cylinder firing fraction does not change from a last engine stroke to a present engine stroke, the remainder value based on the engine cylinder firing fraction.

11. The method of claim 8, where the engine includes a plurality of engine cylinders.

12. The method of claim 11, where each of the plurality of engine cylinders includes variable intake and exhaust valve operators.

13. The method of claim 8, where the engine cylinder firing fraction is an actual total number of cylinder firing events divided by an actual total number of cylinder compression strokes over a predetermined actual total number of cylinder compression strokes.

14. The method of claim 8, where stationary cylinder firing pattern is a firing pattern where cylinders that fire do not change from engine cycle to engine cycle.

15. An engine system, comprising:
   an engine including one or more cylinder deactivating mechanisms;
   a controller including executable instructions stored in non-transitory memory to activate and fire a cylinder, or deactivate and not fire the cylinder, in response to a value based on an engine cylinder firing fraction and a remainder, the remainder a value based on the engine cylinder firing fraction and a previous remainder, the previous remainder added to the firing fraction.

16. The engine system of claim 15, further comprising additional executable instructions stored in non-transitory memory to fire the cylinder in response to a result of the previous remainder added to the firing fraction.

17. The engine system of claim 15, further comprising additional executable instructions stored in non-transitory memory to not fire the cylinder in response to a result of the previous remainder added to the firing fraction.

18. The engine system of claim 15, further comprising additional instructions to operate the engine with a stationary firing pattern.

19. The engine system of claim 15, further comprising additional instructions to operate the engine with a non-stationary firing pattern.

20. The engine system of claim 15, additional instructions to adjust a new remainder to a value of zero.

* * * * *